(12) United States Patent
Yamanashi (10) Patent No.: US 9,501,689 B2
(45) Date of Patent: Nov. 22, 2016

(54) IMAGE PROCESSING APPARATUS AND IMAGE PROCESSING METHOD

(71) Applicant: Panasonic Intellectual Property Management Co., Ltd., Osaka (JP)

(72) Inventor: Tomofumi Yamanashi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 7 days.

(21) Appl. No.: 14/633,457

(22) Filed: Feb. 27, 2015

(65) Prior Publication Data

US 2015/0261998 A1  Sep. 17, 2015

(30) Foreign Application Priority Data

Mar. 13, 2014  (JP) .................................. 2014-049833

(51) Int. Cl.
  *G06K 9/00*  (2006.01)
  *G06T 7/00*  (2006.01)
  *G06T 5/00*  (2006.01)

(52) U.S. Cl.
  CPC ......... *G06K 9/00281* (2013.01); *G06K 9/0061* (2013.01); *G06T 5/003* (2013.01); *G06T 7/0083* (2013.01); *G06T 2207/20148* (2013.01); *G06T 2207/20192* (2013.01); *G06T 2207/30201* (2013.01)

(58) Field of Classification Search
  CPC ......... H04N 1/3224; H04N 1/62; H04N 1/58
  USPC .................................................. 382/258, 260
  See application file for complete search history.

(56) References Cited

U.S. PATENT DOCUMENTS

| | | | | |
|---|---|---|---|---|
| 5,905,807 A | * | 5/1999 | Kado | A61B 5/1176 375/E7.083 |
| 2009/0169101 A1 | * | 7/2009 | Mitarai | G06K 9/0061 382/167 |
| 2010/0061631 A1 | * | 3/2010 | Omori | G06K 9/00234 382/170 |
| 2015/0351682 A1 | * | 12/2015 | Yamanashi | G06T 7/0085 600/476 |
| 2015/0356344 A1 | * | 12/2015 | Yamanashi | G06K 9/00221 382/103 |
| 2016/0042224 A1 | * | 2/2016 | Liu | G06K 9/00248 382/203 |

FOREIGN PATENT DOCUMENTS

| | | |
|---|---|---|
| JP | 2011-008643 | 1/2011 |
| JP | 2011-115460 | 6/2011 |

OTHER PUBLICATIONS

Min, Tae-Hong, and Rae-Hong Park. "Eyelid and eyelash detection method in the normalized iris image using the parabolic Hough model and Otsu's thresholding method." Pattern recognition letters 30.12 (2009): 1138-1143.*
Jiang, Xiao, and Qing-Min Liao. "Skin wrinkles analysis based on digital image processing." Wavelet Active Media Technology and Information Processing (ICWAMTIP), 2012 International Conference on. IEEE, 2012.*
Nobuyuki Otsu "An Automatic Threshold Selection Method Based on Discriminant and Least Squares Criteria" vol. 63-D, No. 4, pp. 349-356, Apr. 1980.

* cited by examiner

*Primary Examiner* — Siamak Harandi
*Assistant Examiner* — Narek Zohrabyan
(74) *Attorney, Agent, or Firm* — Greenblum & Bernstein, P.L.C.

(57) ABSTRACT

An image processing apparatus includes an image obtaining unit that obtains an image of a face, an edge enhancer that performs edge enhancement on the image and forms an edge-enhanced image, a binarizer that performs binarization on the edge-enhanced image and forms a binary image, and an area identifying unit that identifies an eyelash area in the image on the basis of the binary image.

10 Claims, 5 Drawing Sheets

IMAGE PROCESSING APPARATUS AND IMAGE PROCESSING METHOD

BACKGROUND

1. Technical Field

The present disclosure relates to an image processing apparatus and image processing method for performing image processing on a photographic image of a face.

2. Description of the Related Art

In makeup simulation or the like using a photographic image of a face, eyelashes may be distracting. To address this issue, there are techniques of removing eyelashes from a photographic image of a face (hereinafter referred to as "face image") (for example, Japanese Unexamined Patent Application Publication Nos. 2011-8643 and 2011-115460).

Japanese Unexamined Patent Application Publication No. 2011-8643 describes a technique of displaying a face image on a touchscreen display, accepting an operation of specifying an eyelash area from a user, and deleting an image of the specified eyelash area from the face image. Japanese Unexamined Patent Application Publication No. 2011-115460 describes a technique of applying dilation and erosion (morphological image processing) to a face image and removing eyelashes from the face image. With these known techniques, image processing can be performed on the face image with reduced effects of the eyelashes.

Depending on the content of image processing, for example, in the case of detecting wrinkles around eyes in a face image, there are desires to obtain an area of eyelashes (hereinafter referred to as "eyelash area") in the face image with higher precision.

However, the technique described in Japanese Unexamined Patent Application Publication No. 2011-8643 requires a user to specify the area while viewing the face image, and thus much time and effort is taken to obtain the eyelash area with high precision. The technique described in Japanese Unexamined Patent Application Publication No. 2011-115460 removes eyelashes and does not remove an eyelash area. Accordingly, techniques capable of easily identifying an eyelash area in a face image with high precision are needed.

SUMMARY

One non-limiting and exemplary embodiment provides an image processing apparatus capable of easily identifying an eyelash area in a photographic image of a face with high precision.

In one general aspect, the techniques disclosed here feature an image processing apparatus including an image obtaining unit that obtains an image of a face, an edge enhancer that performs edge enhancement on the image and forms an edge-enhanced image, a binarizer that performs binarization on the edge-enhanced image and forms a binary image, and an area identifying unit that identifies an eyelash area in the image on the basis of the binary image.

The present disclosure can enable easily identifying the eyelash area in the photographic image of the face with high precision.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure are described in detail below with reference to the drawings.

First Embodiment

A first embodiment of the present disclosure is an example of the basic aspect of the present disclosure.

Figure 1:
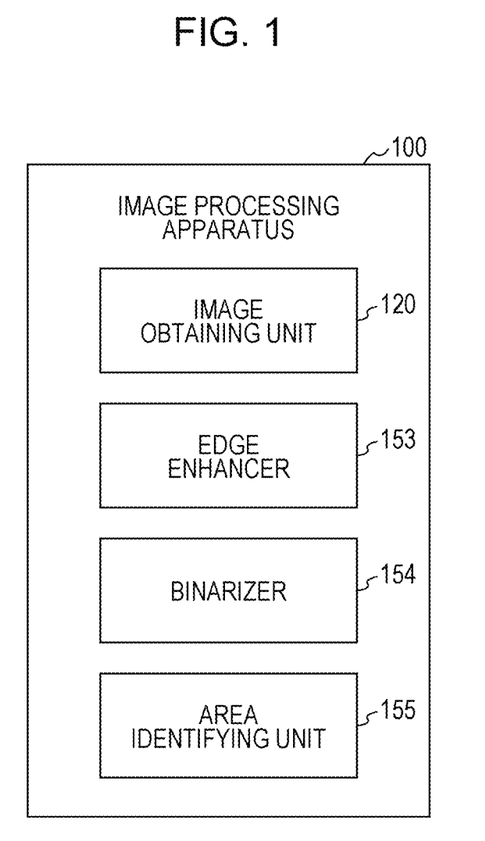
FIG. 1 is a block diagram that illustrates an example configuration of an image processing apparatus according to a first embodiment of the present disclosure.

FIG. 1 is a block diagram that illustrates an example configuration of an image processing apparatus according to the present embodiment.

In FIG. 1, an image processing apparatus 100 includes an image obtaining unit 120, an edge enhancer 153, a binarizer 154, and an area identifying unit 155.

The image obtaining unit 120 obtains a photographic image of a face.

The edge enhancer 153 performs edge enhancement on the obtained photographic image and forms an edge-enhanced image.

The binarizer 154 performs binarization on the formed edge-enhanced image and forms a binary image.

The area identifying unit 155 identifies an eyelash area contained in the photographic image on the basis of the formed binary image.

Examples of the components, which are not illustrated, included in the image processing apparatus 100 may include a central processing unit (CPU), a storage medium that stores a control program, such as a read-only memory (ROM), and a work memory, such as a random-access memory (RAM). In this case, the functions of these components are achieved by execution of the control program by the CPU.

In this manner, the image processing apparatus 100 according to the present embodiment identifies the eyelash area using the result of the edge enhancement and binarization. In a photographic image, eyelashes have sharper edge boundaries and have larger differences in brightness from their surroundings than those in blemishes, winkles, or the like in a face. Accordingly, the image processing apparatus 100 according to the present embodiment can easily identify an eyelash area in a photographic image of a face with high precision.

Second Embodiment

A second embodiment of the present disclosure is an example of a specific aspect in the case where the present disclosure is applied to an image processing apparatus for analyzing a face image and assessing a skin state.

<Configuration of Image Processing Apparatus>

First, a configuration of the image processing apparatus according to the present embodiment is described.

Figure 2:
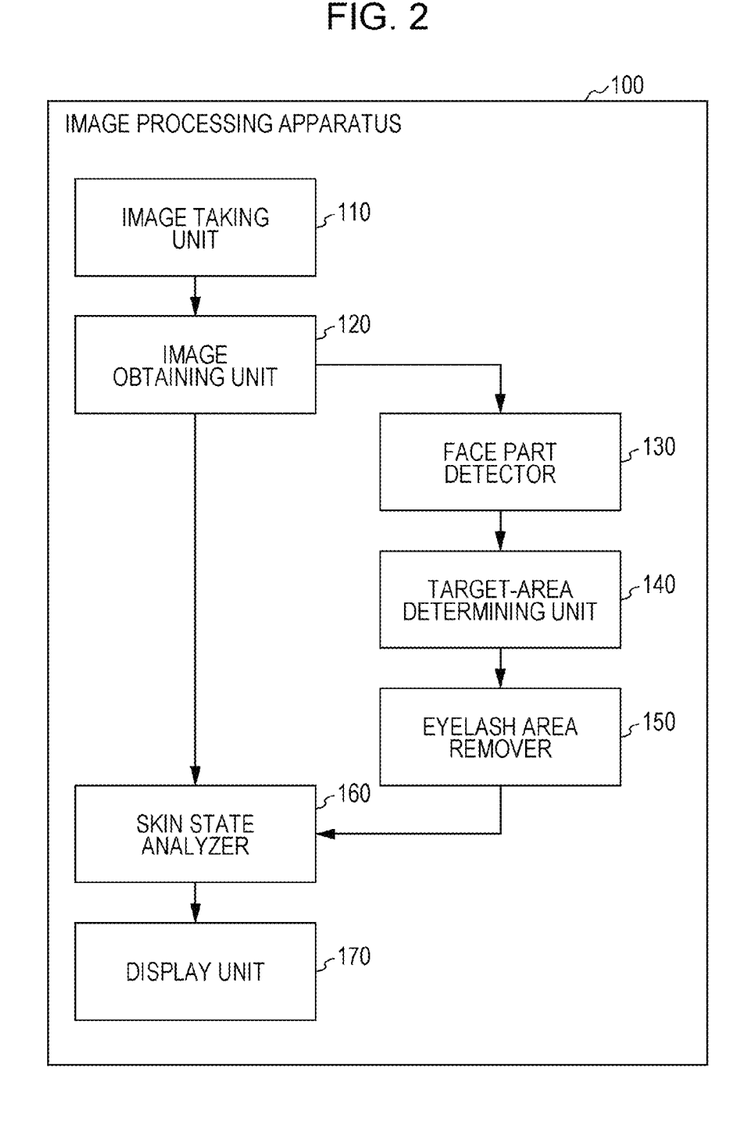
FIG. 2 is a block diagram that illustrates an example configuration of the image processing apparatus according to a second embodiment of the present disclosure.

FIG. 2 is a block diagram that illustrates an example configuration of the image processing apparatus according to the present embodiment.

In FIG. 2, the image processing apparatus 100 includes an image taking unit 110, the image obtaining unit 120, a face part detector 130, a target-area determining unit 140, an eyelash area remover 150, a skin state analyzer 160, and a display unit 170.

One example of the image taking unit 110 may be a still camera including a lens and a color image pickup element. The image taking unit 110 takes an image of a face of a user. The image taking unit 110 outputs the taken image to the image obtaining unit 120. The operations of the image taking unit 110 may be controlled by, for example, the image obtaining unit 120.

The image obtaining unit 120 performs necessary image quality processing, such as brightness adjustment, on the input image and outputs it to each of the face part detector 130 and skin state analyzer 160. As the image quality processing, processing suited for the contents of the edge enhancement, binarization, and skin state analysis, which are described below, is used. In the description described below, an image output from the image obtaining unit 120 is referred to as "photographic image."

The face part detector 130 detects the positions of face parts in the photographic image. The face parts are parts that constitute the face, and examples of the face parts include an eye, nose, and cheeks. The position of each of the face parts can be defined by, for example, the position of a feature point in the face, such as an inner canthus. The feature point in the face is an image feature point indicating the position of the face part. Accordingly, the face part detector 130 can detect the position of the face part by extracting the feature point in the face from the photographic image using a publicly known image feature point detecting technique, such as pattern matching. That is, the position of the extracted feature point in the face is the position of the face part. The face part detector 130 outputs the photographic image and face-part positional information indicating the detected position of each face part to the target-area determining unit 140.

The target-area determining unit 140 determines a rough area that is a target for assessing the skin state (hereinafter referred to as "target area") on the basis of the input face-part positional information. The target area may include an eyelash area. The target-area determining unit 140 outputs the photographic image and target-area information indicating the determined target area to the eyelash area remover 150.

In the present embodiment, the image processing apparatus 100 is an apparatus for detecting wrinkles around eyes and determining the degree of the amount or depth of each of the wrinkles. Accordingly, for example, the target-area determining unit 140 may determine that the target area is an area in which an unnecessary area, such as an area of an eye, is eliminated from a lower-eyelid peripheral area including a lower eyelid.

Figure 5:
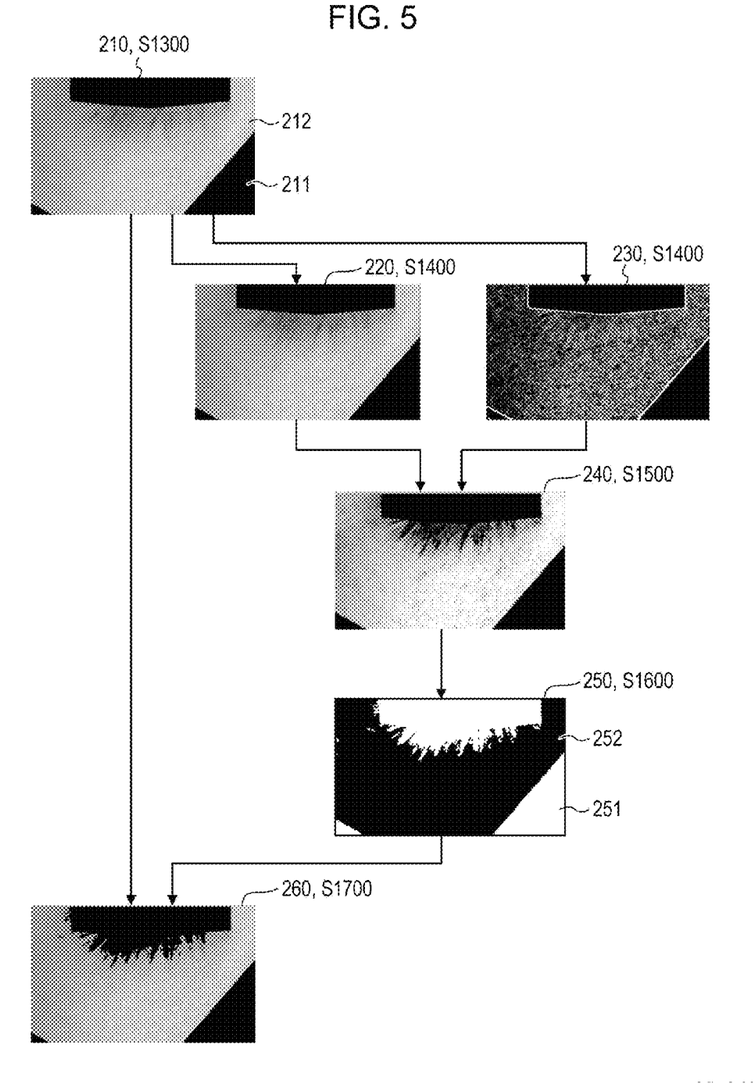
FIG. 5 illustrates an example process of removing an eyelash area in the second embodiment.

The lower-eyelid peripheral area may also be determined in a way described below. The way is described using FIG. 5 by way of example. The lower-eyelid peripheral area is set using detected feature points of the eye, nose, and edge of the face or an internally dividing point and externally dividing point of the feature points. The use of the detected feature points in the face enables setting an appropriate area in accordance with the features of the face of the user. In FIG. 5, the lower-eyelid peripheral area is indicated by 212.

The area of the eye may also be determined in a way described below. The way is also described using FIG. 5 by way of example. The eye area is set using the detected feature points of the eye, as in the case of the lower-eyelid peripheral area. In FIG. 5, the eye area (210) is set using the feature points of the outer canthus, inner canthus, and center of the lower portion of the eye.

The eyelash area remover 150 eliminates the eyelash area from the target area on the basis of the input target-area information. More specifically, the eyelash area remover 150 performs edge enhancement and binarization on the target area in the photographic image and identifies the eyelash area. The eyelash area is the area identified by the image processing apparatus as that in which the eyelashes exist in the photographic image.

<Configuration of Eyelash Area Remover>

Figure 3:
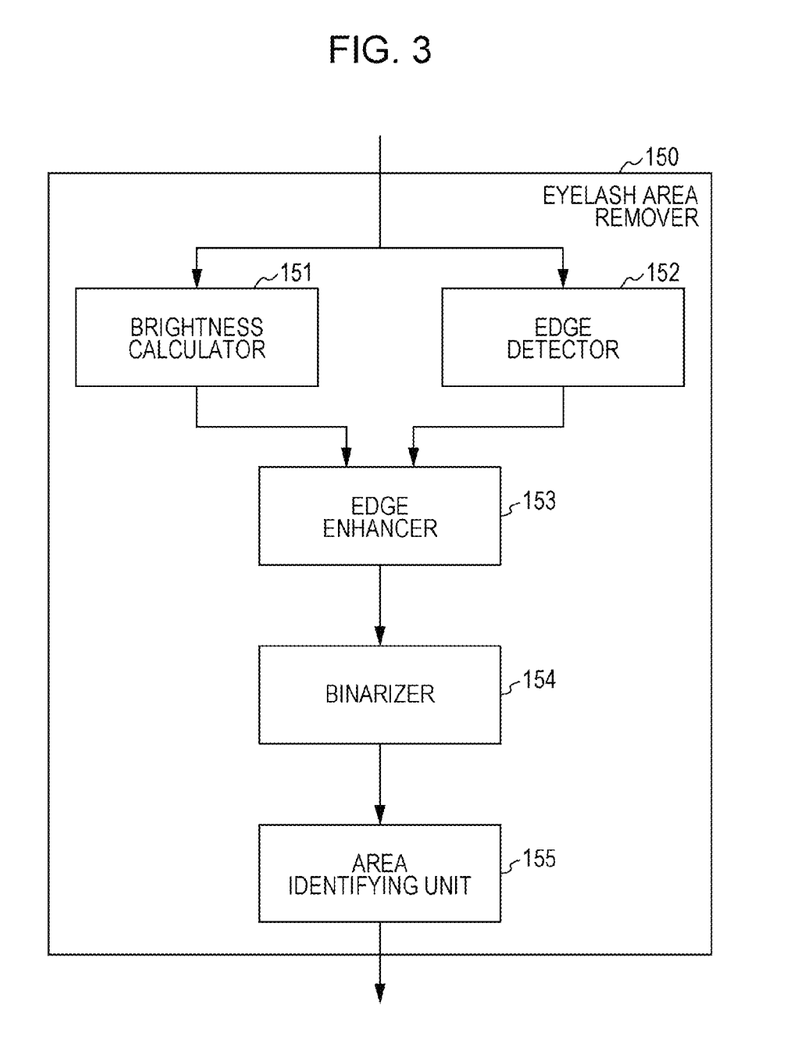
FIG. 3 is a block diagram that illustrates an example configuration of an eyelash area remover in the second embodiment.

FIG. 3 is a block diagram that illustrates an example configuration of the eyelash area remover 150.

In FIG. 3, the eyelash area remover 150 includes a brightness calculator 151, an edge detector 152, the edge enhancer 153, the binarizer 154, and the area identifying unit 155.

The brightness calculator 151 calculates the brightness of each portion in the input photographic image. More specifically, the brightness calculator 151 performs publicly known grayscale processing, such as a weighted average method using a national television system committee (NTSC) coefficient, on the target area in the photographic image and forms a grayscale image. The brightness calculator 151 outputs the formed grayscale image to the edge enhancer 153.

The edge detector 152 detects the edge portion in the input photographic image. More specifically, the edge detector 152 performs publicly known edge detection, such as the Sobel method, on the target area in the photographic image and forms an edge image indicating the edge portion. The edge detector 152 outputs the formed edge image to the edge enhancer 153.

The edge enhancer 153 performs the edge enhancement on the photographic image and forms an edge-enhanced image. More specifically, the edge enhancer 153 forms the edge-enhanced image in which the edge portion in the photographic image is enhanced, by taking the difference between the pixel value of the input grayscale image and that of the input edge image. The edge enhancer 153 outputs the formed edge-enhanced image to the binarizer 154.

The entire processing performed by the brightness calculator 151, edge detector 152, and edge enhancer 153 may also be referred to as the edge enhancement.

The binarizer 154 performs the binarization on the input edge-enhanced image and forms a binary image. More specifically, the binarizer 154 forms the binary image using, for example, a threshold preset by calculation using an Otsu's technique described in "Automatic Threshold Selection Based on Discriminant and Least-Squares Criteria," Transactions of the Institute of Electronics, Information and Communication Engineers D, Vol. J63-D No. 4, pp. 349-356, April, 1989. The binarizer 154 outputs the formed binary image to the area identifying unit 155.

The area identifying unit 155 identifies the eyelash area contained in the photographic image on the basis of the input binary image. More specifically, the area identifying unit 155 determines that an area in which the area of the pixel value corresponding to the eyelash area in the binary image is eliminated from the target area in the photographic image (hereinafter referred to as "eyelash eliminated area") is the area in which the eyelash area is eliminated from the target area in the photographic image. The area identifying unit 155 outputs eyelash-eliminated-area information indicating the eyelash eliminated area to the skin state analyzer 160 illustrated in FIG. 2.

The skin state analyzer 160 in FIG. 2 performs publicly known skin state analysis on the target area in which the eyelash area is eliminated (eyelash eliminated area) on the basis of the input photographic image and eyelash-eliminated-area information. The skin state analysis is assessment of the state of the skin contained in the image. One example of the skin state analysis may be detection of the amount of wrinkles, the length and depth of each wrinkle, and the like. The skin state analyzer 160 outputs processing-result information indicating the result of the skin state analysis to the display unit 170. One example of the processing-result information may be an image in which a line having a color or thickness corresponding to the depth of the wrinkle is superimposed along the detected wrinkle on the photographic image.

The display unit 170 may include, for example, a liquid crystal display and displays the input processing-result information.

Examples of the components, which are not illustrated, included in the image processing apparatus 100 may include a CPU, a storage medium that stores a control program, such as a ROM, and a work memory, such as a RAM. In this case, the functions of these components are achieved by execution of the control program by the CPU.

The image processing apparatus 100 having such a configuration can identify the eyelash area by performing the edge enhancement and binarization on the photographic image and can perform the skin state analysis on the area in which the eyelash area is removed from the target area determined on the basis of the positions of face parts.

<Operations of Image Processing Apparatus>

Figure 4:
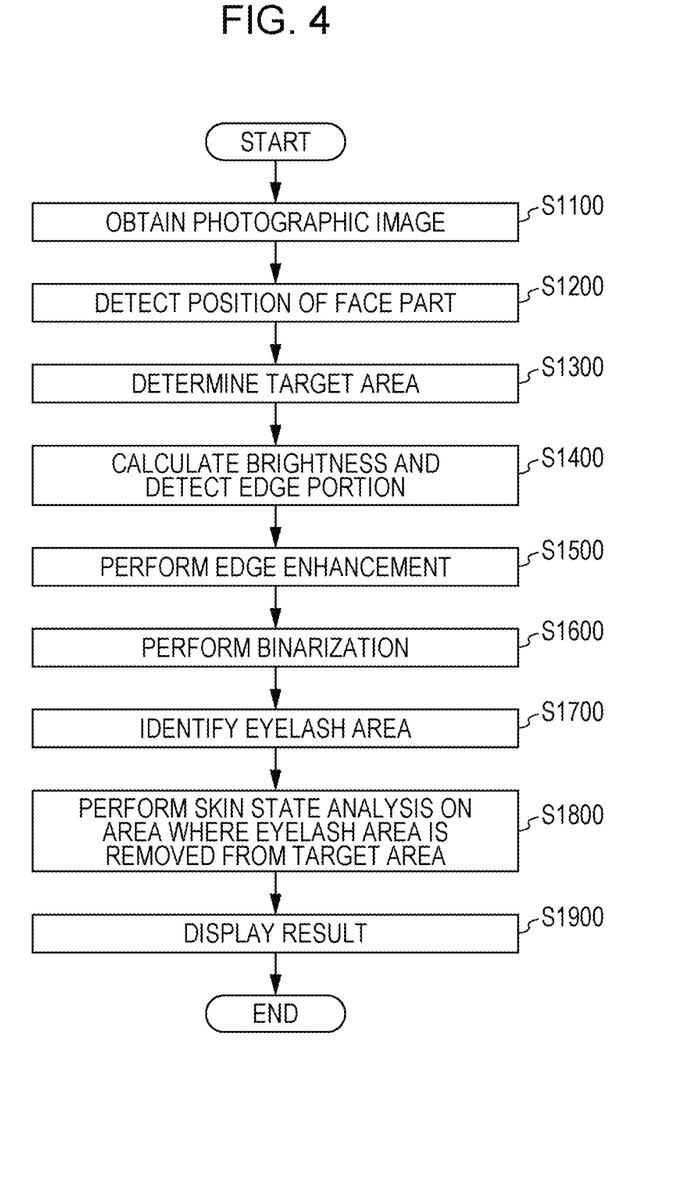
FIG. 4 is a flowchart that illustrates example operations of the image processing apparatus according to the second embodiment.

Next, operations of the image processing apparatus 100 are described with reference to FIGS. 4 and 5. FIG. 4 is a flowchart that illustrates example operations of the image processing apparatus 100. FIG. 5 illustrates an example process of removing the eyelash area.

At step S1100, the image obtaining unit 120 obtains a photographic image of a face of a user using the image taking unit 110.

At step S1200, the face part detector 130 detects the position of each face part in the photographic image.

At step S1300, the target-area determining unit 140 determines the target area on the basis of the position of the face part. One example of the target area may be a lower-eyelid peripheral area including the lower eyelid, as described above.

The target-area determining unit 140 cuts a rectangular area including the lower eyelid, for example, as illustrated as a first image 210 in FIG. 5, from the photographic image and sets an unnecessary portion (for example, portion corresponding to the eye) in the cut partial image as a solid black area 211. That is, a remaining area 212 in the rectangular area is the target area. As illustrated in FIG. 5, the target area (area 212) may contain not only the skin but also the eyelashes.

At step S1400, the brightness calculator 151 calculates the brightness of each portion in the target area, and the edge detector 152 detects an edge portion in the target area.

The brightness calculator 151 may perform, for example, grayscale processing on the partial image (first image 210) obtained by cutting by the target-area determining unit 140 and forms a grayscale image, as illustrated as a second image 220 in FIG. 5. The edge detector 152 perform edge detection on the partial image (first image 210) obtained by cutting by the target-area determining unit 140 and forms an edge image, as illustrated as a third image 230 in FIG. 5.

At step S1500, the edge enhancer 153 performs edge enhancement on the target area in the photographic image on the basis of the calculated brightness of each portion and the detected edge portion and forms an edge-enhanced image.

The edge enhancer 153 forms the edge-enhanced image, as illustrated as a fourth image 240 in FIG. 5, by taking the difference between the grayscale image (second image 220) and the edge image (third image 230). The fourth image 240 includes the eyelash image with the more enhanced edge and the darkened eyelashes, in comparison with the first image 210.

At step S1600, the binarizer 154 performs binarization on the edge-enhanced image and forms a binary image.

The binarizer 154 forms the binary image, such as a fifth image 250 in FIG. 5. The fifth image 250 is made up of a white area 251 and a black area 252. The white area 251 is an area in which the pixel value in the edge-enhanced image (fourth image 240) is lower than the threshold. The black area 252 is an area in which the pixel value in the edge-enhanced image is equal to or higher than the threshold.

At step S1700, the area identifying unit 155 identifies an eyelash area in the target area on the basis of the binary image. That is, the area identifying unit 155 identifies an eyelash eliminated area.

The area identifying unit 155 identifies an image in which the pixel value of the area other than the eyelash eliminated area is set at "0" (black), as illustrated as a sixth image 260 in FIG. 5, as the eyelash eliminated area.

The area identifying unit 155 may produce mask information in which the value "0" is set to the white area 251 in the binary image (fifth image 250) and the value "1" is set to the black area 252 in the binary image. In this case, the area identifying unit 155 may, for example, form the image of the eyelash eliminated area in the photographic image by multiplying the partial image (first image 210) cut by the target-area determining unit 140 by the binary image (fifth image 250). This processing may also be performed by the skin state analyzer 160.

The threshold for use in the binarization may be slightly smaller than the value calculated as a threshold for discriminating between the eyelash area and the skin area with high precision. This aims to more reliably prevent an area that is not the eyelash area in actuality from being misidentified as the eyelash area. On the contrary, the threshold may be set to a larger value in order to more reliably prevent an actual eyelash area from not being identified as the eyelash area. That is, the threshold for use in the binarization is set to an appropriate value according to the content and purpose of the skin state analysis.

The threshold may be specified by a user. That is, the user can adjust the threshold while viewing the image containing the area identified as the eyelash area on the basis of the threshold input by the user. In this case, the eyelash eliminated area with a high level of user satisfaction can be formed.

At step S1800, the skin state analyzer 160 performs skin state analysis on the eyelash eliminated area (area in which the eyelash area is eliminated from the target area).

At step S1900, the skin state analyzer 160 displays the result of the skin state analysis using the display unit 170.

With the above-described operations, the image processing apparatus 100 can identify the eyelash area by performing the edge enhancement and binarization on the photographic image and can perform the skin state analysis on the area in which the eyelash area is removed from the target area determined on the basis of the positions of the face parts.

The target-area determining unit 140 and the eyelash area remover 150 may cut a partial image being the image of the target area and up to form the image of the eyelash eliminated area. In another case, they may simply determine the eyelash eliminated area. In the former case, the skin state analyzer 160 may not receive the photographic image.

<Advantages in Present Embodiment>

As described above, the image processing apparatus 100 according to the present embodiment identifies the eyelash area by performing the edge enhancement and binarization on the photographic image and performs the skin state analysis on the area in which the eyelash area is removed from the target area determined on the basis of the positions of the face parts.

In the photographic image, the eyelashes typically have sharper edge boundaries and have larger differences in brightness from their surroundings than those in blemishes, winkles, or the like in a face (see the first illustration 210 in FIG. 5). That is, the eyelash area can be extracted precisely by performing the edge enhancement and binarization (see the fifth illustration 250 in FIG. 5).

Accordingly, the image processing apparatus 100 according to the present embodiment can easily identify the eyelash area in the photographic image of the face with high precision.

The image processing apparatus 100 according to the present embodiment can identify the skin area in which the eyelash area is removed from the face image on the basis of the eyelash area easily identified with high precision in the above-described way. This enables the image processing apparatus 100 according to the present embodiment to effectively reduce the effects of the eyelashes in the skin state analysis performed on an area around the eye, such as the lower eyelid, corner portion, and outer canthus. For example, even if long false eyelashes are attached to the outer canthus side, the wrinkles in the outer canthus (so-called crow's feet) can be detected.

Because the image processing apparatus 100 according to the present embodiment determines the target area on the basis of the positions of the face parts, it can accurately identify the skin area and perform the skin state analysis. Accordingly, for example, not only in the state where the eyelids are closed, but also in the state where they are opened, the skin state analysis can be performed accurately.

<Variation of Present Embodiment>

The image processing apparatus 100 can use the result of identifying the eyelash area in processing other than the skin state analysis. For example, the image processing apparatus 100 may use the result of identifying the eyelash area in image modification of applying a skin color to the eyelash area and removing the eyelashes from the face image.

The image processing apparatus 100 may adjust various parameters for use in the edge enhancement and binarization (for example, a threshold in binarization) in accordance with the color or state of the skin, color or thickness of eyelashes, necessary accuracy, the use of the determination, or the like.

In the present embodiment, the image processing apparatus 100 uses the eyelash area as the target of the identification. The image processing apparatus 100 can also use areas of other hair, for example, head hair, an eyebrow, and mustache as the target of the identification.

An image processing apparatus of the present disclosure includes an image obtaining unit that obtains an image of a face, an edge enhancer that performs edge enhancement on the image and forms an edge-enhanced image, a binarizer that performs binarization on the edge-enhanced image and forms a binary image, and an area identifying unit that identifies an eyelash area in the photographic image on the basis of the binary image.

The above-described image processing apparatus may further include a brightness calculator that calculates brightness in the image and an edge detector that detects an edge in the image. The edge enhancer may form the edge-enhanced image on the basis of the calculated brightness and the detected edge.

The above-described image processing apparatus may further include a face part detector that detects a position of a part of the face in the image, a target-area determining unit that determines a target area for skin state analysis on the basis of the position of the part, an eyelash area remover that eliminates the eyelash area from the target area, and a skin state analyzer that performs the skin state analysis on the target area from which the eyelash area is eliminated.

In the above-described image processing apparatus, the skin state analysis may include detection of wrinkles in a skin.

An image processing method of the present disclosure includes obtaining an image of a face, performing edge enhancement on the image to form an edge-enhanced image, performing binarization on the edge-enhanced image to form a binary image, and identifying an eyelash area in the image on the basis of the binary image.

An image processing method includes obtaining an image of a face, performing edge enhancement on the image to form an edge-enhanced image, receiving a threshold for use in binarization to be performed on the edge-enhanced image from a user, forming a binary image on the threshold received from the user, identifying an eyelash area in the image on the basis of the binary image, and displaying the image including the identified eyelash area.

The present disclosure is useful as an image processing apparatus and image processing method capable of easily identifying an eyelash area in a photographic image of a face with high precision.

What is claimed is:

1. An image processing apparatus comprising:
a memory that stores an image of a face;
a central processing unit (CPU) that:
detects a position of a target part of the face in the image;
determines a rough area for processing based on the position of the target part;
generates a grayscale image for the rough area;
detects edge portions in the grayscale image for the rough area;
generates an edge image indicating the edge portions in the grayscale image for the rough area;
generates an edge-enhanced image including pixel values, the pixel values being differences between pixel values included in the grayscale image and pixel values included in the edge image;
generates a binary image including a first area in which the pixel values in the edge-enhanced image are lower than a threshold and a second area in which the pixel values in the edge-enhanced image are equal to or higher than the threshold;

identifies the first area as an eyelash area; and
removes the eyelash area from the rough area to provide a skin analysis area.

2. The image processing apparatus according to claim 1, wherein the CPU performs a skin state analysis on the skin analysis area.

3. The image processing apparatus according to claim 2, wherein the skin state analysis includes detection of wrinkles on the skin analysis area.

4. An image processing method comprising:
obtaining an image of a face;
detecting a position of a target part of the face in the image;
determining a rough area for processing based on the position of the target part;
generating a grayscale image for the rough area;
detecting edge portions in the grayscale image for the rough area;
generating an edge image indicating the edge portions in the grayscale image for the rough area;
generating an edge-enhanced image including pixel values, the pixel values being differences between pixel values included in the grayscale image and pixel values included in the edge image;
generating a binary image including a first area in which the pixel values in the edge-enhanced image are lower than a threshold and a second area in which the pixel values in the edge-enhanced image are equal to or higher than the threshold; and
identifying the first area as an eyelash area; and
removing the eyelash area from the rough area to provide a skin analysis area.

5. The image processing apparatus according to claim 3, wherein
the image processing apparatus receives the threshold from a user.

6. The image processing apparatus according to claim 5, wherein
the face in the image includes a closed eyelid.

7. The image processing apparatus according to claim 1, wherein
a skin color is applied to the eyelash area.

8. The image processing method according to claim 4, further comprising:
analyzing skin state on the skin analysis area.

9. The image processing method according to claim 8, wherein the skin state analysis includes detection of wrinkles on the skin analysis area.

10. The image processing method according to claim 9, further comprising:
receiving the threshold from a user.

* * * * *